Nov. 6, 1956  A. C. WINTEMBERG  2,769,401
RAILWAY TRUCK
Filed Jan. 24, 1952  2 Sheets-Sheet 1
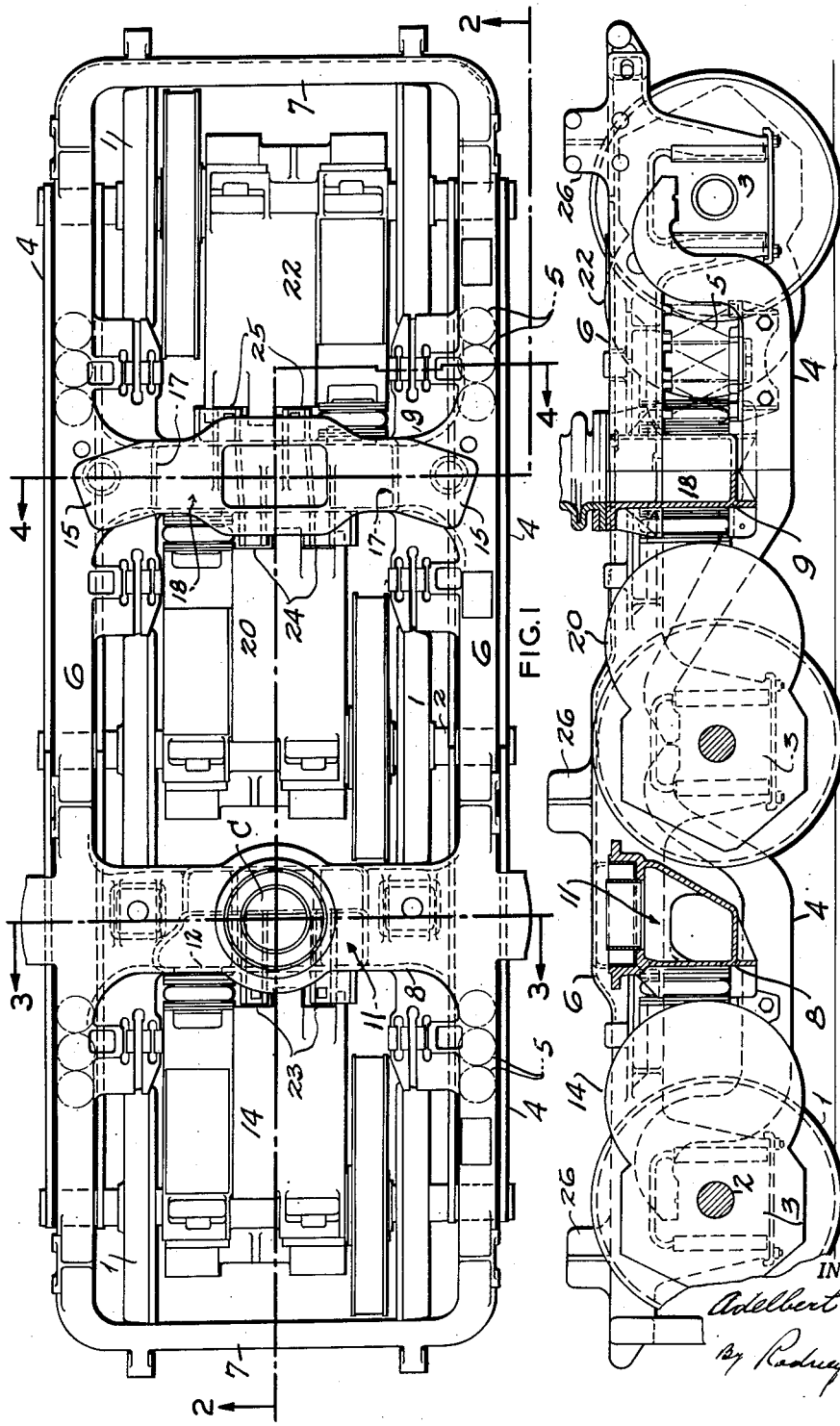
INVENTOR
Adelbert C. Wintemberg
by Rodney Bedell
atty.

2,769,401

RAILWAY TRUCK

Adelbert C. Wintemberg, Drexel Hill, Pa., assignor to General Steel Castings Corporation, Granite City, Ill., a corporation of Delaware Application January 24, 1952, Serial No. 268,034

6 Claims. (Cl. 105—59)

The invention relates to railway rolling stock and more particularly to railway vehicle trucks of the type having at least three wheel and axle assemblies and a truck frame carried thereby and provided with three points of support for the vehicle body, there being individual electric motors associated with each assembly.

The main object of the invention is to facilitate the distribution of streams of cooling air to the motors of such a truck by using portions of the truck frame as air conduits and leading the air from compressors on the vehicle body mounted on the truck to the ends of the motor housings.

Another object is to provide a vehicle body support of the kind described which shall be at a minimum height above the rail.

The structure by which these and other detail objects are attained will appear from the following description, reference being had to the accompanying drawings, in which:

Figure 1 is a top view of a six wheel truck of the type described.

Figure 2 is in part a longitudinal section and in part a side elevation of the truck shown in Figure 1.

Figure 3:
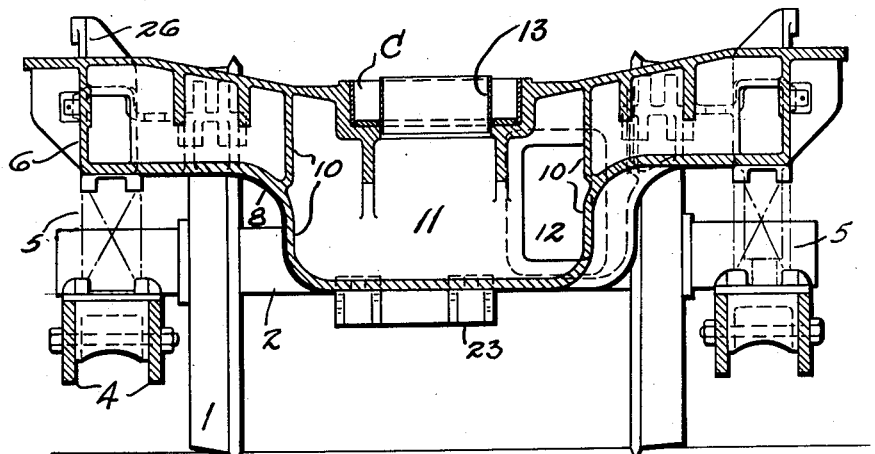
Figures 3 and 4 are vertical transverse sections taken on the corresponding section lines of Figure 1.
Figure 4:
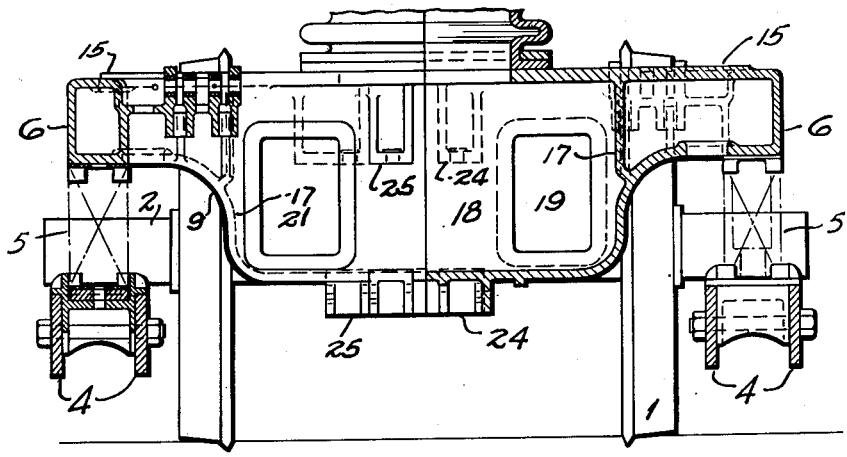

The truck includes the usual wheels 1, axles 2, journal boxes 3, drop equalizer bars 4, with their ends carried upon adjacent journal boxes at the same side of the truck, and equalizer springs 5. The truck frame carried upon springs 5 includes side members or wheel pieces 6, end members 7 and transverse transoms 8 and 9, spaced apart longitudinally of the truck, and each consisting of a hollow box section substantially throughout its length and including a top wall, a bottom wall and upright side walls.

Intermediate the ends of transom 8, the top wall is recessed to form a center plate-like structure C, forming a point of support for the vehicle body. At opposite sides of center plate structure C the transom is provided with upright transverse webs 10, forming with the top, bottom and side walls an air chamber 11, there being an outlet 12 in the transom side wall nearer to the adjacent end of the truck. Air is lead through conduits 13 from the vehicle body (not shown) through an opening in center plate C to chamber 11 and from the latter through opening 12 to the end of the motor housing 14 mounted on the left hand wheel and axle assembly.

Adjacent each end of transom 9, the transom top wall is shaped to form a bearing 15 for supporting the vehicle body at points spaced transversely of the longitudinal center line of the truck.

Spaced inwardly of the truck from each bearing 15 is a transom transverse web 17 merging with the top, bottom and side walls of the transom so that the intermediate part of the transom forms an air chamber 18 corresponding to chamber 11. The inner side wall of the transom has an opening 19 leading to the end of the motor housing 20 mounted on the middle wheel and axis assembly. The outer side wall of the transom has an opening 21 leading to the end of the motor housing 22 mounted on the right hand wheel and axle assembly.

Brackets 23 on transom 8 and brackets 24, 25 on transom 9 are formed integrally with the transom walls and provide supports for the adjacent ends of the motor housings.

Preferably the truck frame is formed of a one piece metal casting and the main members of the truck frame merge with each other and are shaped to effect the necessary strength with a minimum amount of metal. Also, the intermediate portions of the transoms are substantially deeper than the end portions to provide suitable supports for the motor noses and to provide adequate conduits for transmitting air to the openings in the walls leading to the motors. Suitable brackets 26 for other members of the brake gear are formed integrally with the truck frame.

By leading air through the top walls of transoms 8 and 9 into chambers 11 and 18 and distributing air from the chambers into the ends of the motor housings, it is possible to avoid elongated boots leading from the compressors or air reservoirs (not shown) on the vehicle body direct to the motors. At the same time, by supporting the vehicle body at three points spaced longitudinally of the truck from the middle wheel and axle assembly and the associated motor, it is possible to avoid raising the body supporting portion of the truck frame to such a height above the motor that the distance to the rail and the center of gravity of the body load would be objectionable. The three points of support of the vehicle body on the truck frame are so related to each other and to the points of support of the motors on the transoms 8 and 9 so that the central swivel bearing support C for the vehicle body is positioned at the side of the middle axle opposite to the motor side and where there is sufficient room to provide the desired size swivel bearing with a central air conduit at a lower height above the rail than if support C were above the axle on the motor. At the same time, there is no undue increase in the truck wheel base. It can readily be seen that the portion of the truck having the two motors between the middle axle and one end axle is heavier than the portion with only one motor and therefore better truck frame loading conditions would be provided for obtaining equal distribution of the loads from the frame to the wheels if the central bearing which is located on the lighter portion of the truck carries a greater portion of the body load as compared to the body load carried by the other two bearings 15.

The truck illustrated differs from and is advantageous over some six-wheel three motor trucks previously in use in which the vehicle body is spring-supported at a plurality of points on the truck frame or is wholly and directly supported from a single center plate positioned over the middle axle, which trucks require that the body supports be at a higher level than shown by applicant.

The truck illustrated also differs from six-wheel three motor trucks previously in use in which the reduced capacity of the vehicle body supporting structure has resulted in the use of elongated conduits leading from the vehicle body direct to the tops of the motors independently of the truck frame. Obviously, the more and longer exposed flexible conduits in use, the greater the maintenance requirements for maintaining the conduits tight.

The structure attains the objects stated in the introductory portion of the specification, but it will be understood that variations in the structure may be made without departing from the spirit of the invention and the exclusive use of those modifications coming within the scope of the claims is contemplated.

What is claimed is:

1. In a railway truck, three wheel and axle assemblies, a motor on each assembly, a truck frame mounted on said assemblies and having three points of support for a vehicle body, one of said supports being on the longitudinal center line of the truck and forming a center bearing support about which the truck may swivel and the other two supports being spaced apart transversely of the truck and spaced from said center plate longitudinally of the truck and over which the vehicle body may slide as it swivels about said center bearing, the truck frame forming air conduits leading to the motors, there being an axial opening through said center bearing to admit air to one of said conduits, and there being an opening through the top of the frame between the other two supports to admit air to the other of said conduits.

2. In a railway truck, three wheel and axle assemblies, a motor on each assembly, a truck frame supported from said assemblies and having a transverse transom of boxlike cross section between the middle assembly and each end assembly, a center plate bearing on one of said transoms for mounting a vehicle body, a pair of bearings spaced apart transversely of the truck integrally provided on the other of said transoms for mounting the vehicle body whereby the same has a three-point support, there being an air passageway leading downwardly through said center plate bearing and longitudinally of the truck through one of the side walls of the corresponding transom to the motor on the adjacent end axle, and an air passageway leading downwardly through the top of the other transom between said spaced bearings and longitudinally of the truck through one side wall of the transom to the motor on the middle axle and through the other side wall of the transom to the motor on the other end axle.

3. A railway motor truck frame comprising side members, spaced transverse transoms connecting said side members, a vehicle body mounting at the center of one of said transoms, a lateral bracket on said transom adjacent to said mounting and arranged to support a motor housing, said transom forming an air chamber having an outlet positioned outboard from said mounting and bracket, lateral brackets on opposite sides of the other transom near the center portion thereof, vehicle body mountings spaced apart transversely of the frame on said latter-mentioned transom, said latter-mentioned transom forming an air conduit having outlets positioned outboard from the brackets thereon but positioned inboard from the transversely spaced vehicle body mountings on the transom.

4. A railway motor truck frame comprising side members, first and second spaced transverse transoms of hollow box section connecting said side members, a vehicle body first mounting provided centrally on the upper surface of said first transom, partitions provided interiorly of said first transom to define an air chamber, said body mounting having a passage extending downwardly therethrough for communicating said air chamber with a source of air, said first transom having an air outlet through the side wall thereof proximate the adjacent end of the frame, said second transom having a pair of vehicle body second mountings provided on its upper surface adjacent its ends for cooperation with said first body mounting to provide a three-point body support, webs provided interiorly of said second transom inwardly of said second body mounting for merging with the top, bottom, and side walls of said second transom to define an air chamber, said second transom having an air inlet centrally of its upper surface intermediate the second body mounting, and a pair of air outlets in opposite side walls and on opposite sides of the frame centerline.

5. In a railway truck, three axle and wheel assemblies, a rigid truck frame supported therefrom and including side members and transverse transoms connecting said side members and positioned intermediate the middle axle and each end axle, said transoms having hollow portions with spaced side walls and a top wall, a motor on each assembly including a housing projecting from the axle longitudinally of the truck with its projected ends supported from an adjacent transom, one of said housing projected ends being supported from one of the transoms and the other two housing projected ends being supported from the other transom, vehicle body sliding bearings carried directly on the latter-mentioned transom near the opposite sides of the truck, and a vehicle body center support carried directly upon the other transom at the longitudinal center of the truck and forming part of a swivel connection for the truck and body, there being an air passage extending downwardly through said center support and associated transom top wall, the walls of the latter-mentioned transom forming an air conduit leading to the motor housing supported from said transom.

6. A truck as described in claim 5 which includes an air passage leading downwardly through the top wall of the transom between said laterally spaced body support elements, the walls of said latter-mentioned transom forming air conduits leading from said passage to the motor housings supported from the transom.

References Cited in the file of this patent

UNITED STATES PATENTS

| | | |
|---|---|---|
| 975,303 | Vauclain | Nov. 8, 1910 |
| 1,717,058 | Miller | June 11, 1929 |
| 1,895,500 | Todd | Jan. 31, 1933 |
| 2,164,444 | Blomberg | July 4, 1939 |